Dec. 20, 1966   I. K. DORTORT   3,293,531
MAGNETIC VERNIER CONTROL FOR REGULATED RECTIFIERS
Filed March 12, 1964   3 Sheets-Sheet 1
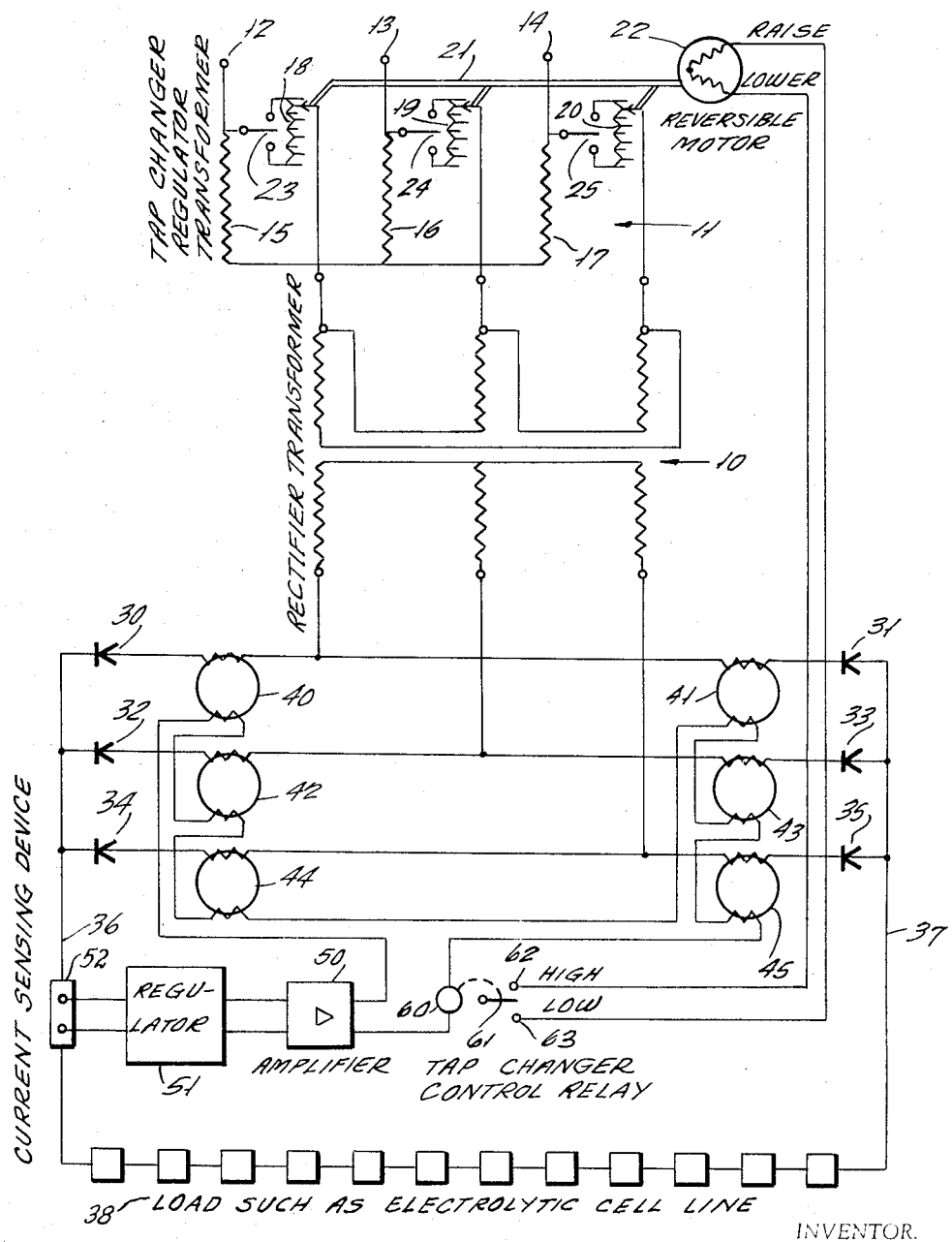
INVENTOR.
ISADORE K. DORTORT
BY
OSTROLENK, FABER, GERB & SOFFEN
ATTORNEYS Dec. 20, 1966  I. K. DORTORT  3,293,531
MAGNETIC VERNIER CONTROL FOR REGULATED RECTIFIERS
Filed March 12, 1964  3 Sheets-Sheet 2
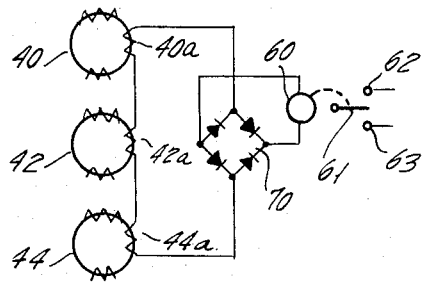
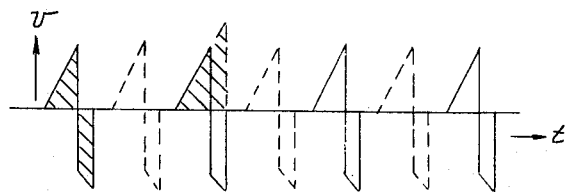
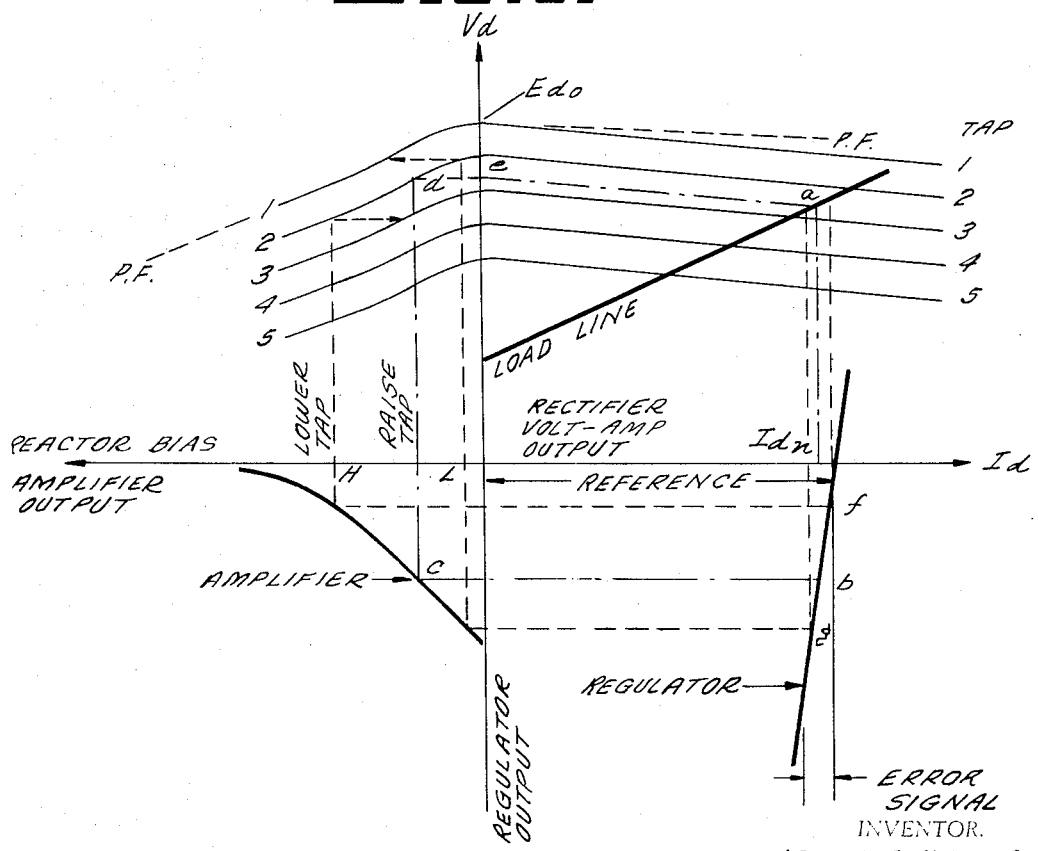
INVENTOR.
ISADORE K. DORTORT
BY
OSTROLENK, FABER, GERB & SOFFEN
ATTORNEYS

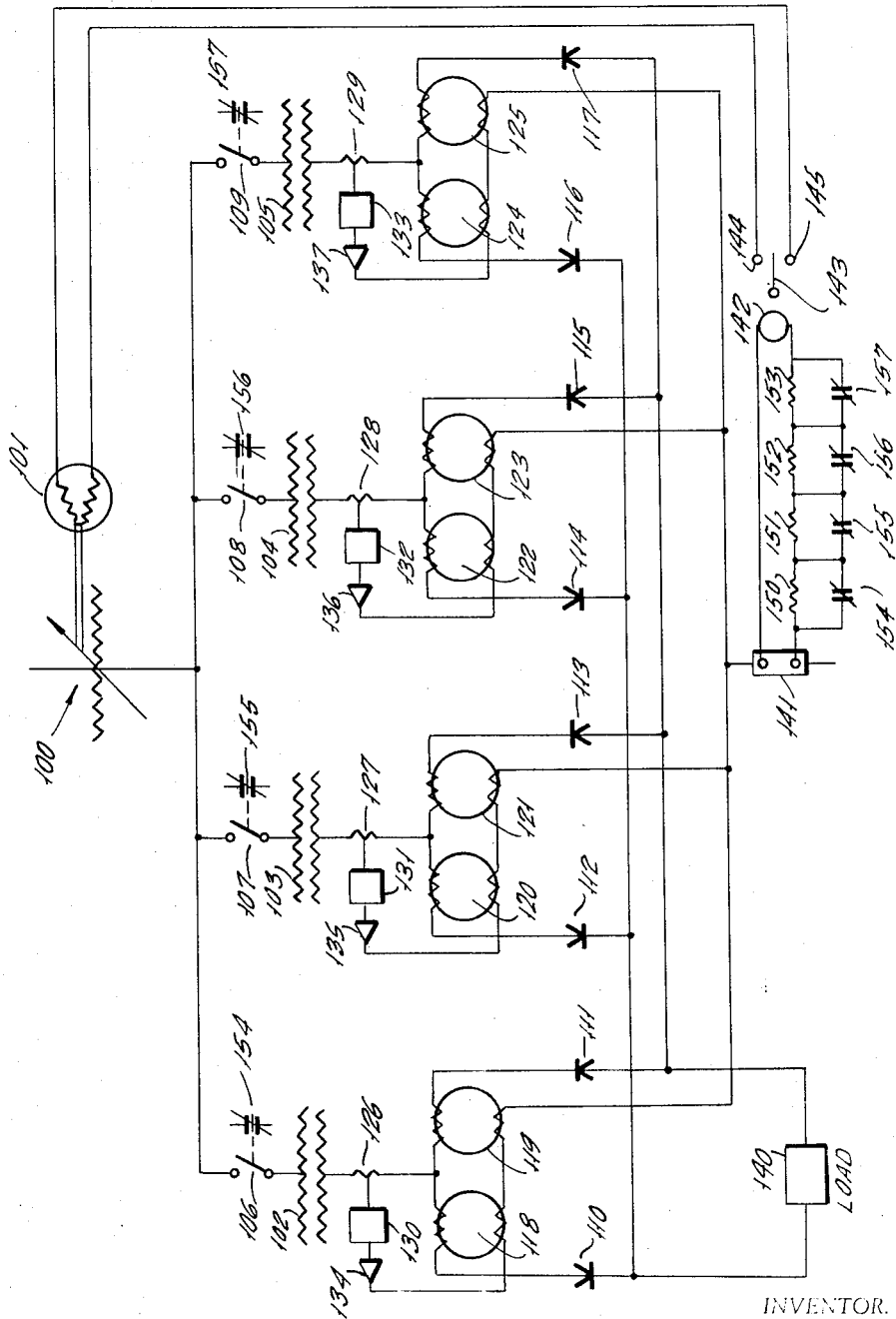

United States Patent Office 3,293,531
Patented Dec. 20, 1966

1

3,293,531
MAGNETIC VERNIER CONTROL FOR
REGULATED RECTIFIERS
Isadore K. Dortort, Philadelphia, Pa., assignor to I-T-E
Circuit Breaker Company, Philadelphia, Pa., a corporation of Pennsylvania
Filed Mar. 12, 1964, Ser. No. 351,446
5 Claims. (Cl. 321—16)

My invention relates to a novel vernier control system for rectifiers having regulation transformers therefor which operate over a relatively wide range of voltage.

Regulation of the output of rectifiers by means of phase control, whether accomplished by direct gating of rectifier elements such as thyristors or of self-saturating reactors connected in series with free conducting diodes, has the advantage of fast and accurate control, but incurs a penalty in the form of reduction of power factor proportional to the reduction in D.-C. voltage.

To avoid this penalty, it is common practice, in the application of high power rectifiers, to install a primary regulator ahead of the rectifier transformer, either of the under-load tap-changing type or the induction regulator type. Both types of regulators are relatively inaccurate and slow. In addition, the tap-changer type can only adjust the output voltage in discrete steps, equal to the total range of voltage adjustment required, divided by the number of steps available in standard regulators. Particularly if the rectifier is supplying a load having a high back-E.M.F., these discrete steps become objectionable because the current increments are likely to be three or four times greater in percent of rated current than the percentage change of voltage in terms of rated voltage. Furthermore, if frequent adjustments of voltage are required due to incoming line voltage variations or load characteristics, a compromise must be made between the desired accuracy and speed of control, and the life of the mechanism of the primary regulators.

The principle of the present invention is to employ a primary voltage regulator of wide range, together with small range self-saturating reactors to act as a vernier between the step voltages of the tap-changer type of regulator and to provide faster and more accurate control than can be obtained with either the tap-changer or the induction type of regulator. Other advantages are also obtained and will be described later. The system selected to describe the invention is based on the use of a tap-changer regulator (step voltage regulator) because it is the most prevalent, and more frequently requires vernier control. However, the invention is equally applicable to installations employing an induction regulator.

Accordingly, a primary object of this invention is to provide a novel regulation system for rectifiers.

Another object of this invention is to increase the accuracy of a regulator system.

A still further object of this invention is to provide a novel, inexpensive auxiliary magnetic regulator system for a regulation system including a tap-changing transformer or step voltage regulators.

A further object of this invention is to provide a novel auxiliary control circuit for reducing the number of operations required of a discrete step-type regulator system.

Still another object of this invention is to provide a novel auxiliary magnetic vernier control system for a plurality of parallel connected rectifiers having a common large step-type regulator whereby the individual rectifier outputs can be balanced.

2

These and other objects of my novel invention will become apparent from the following description when taken in connection with the drawings, in which:

FIGURE 1 schematically illustrates a regulated rectifier system using the magnetic vernier control of the invention.

FIGURE 2 graphically represents the operation of the system of FIGURE 1.

FIGURE 3 illustrates one manner in which the vernier control of FIGURE 1 could be modified.

FIGURE 4 illustrates the operation of the modification of FIGURE 3.

FIGURE 5 is a circuit diagram to illustrate the manner in which the novel invention can be applied to a large number of parallel connected units having a single step-type regulation means.

Referring first to FIGURE 1, I have illustrated therein a regulated rectifier system which includes a power transformer 10 of the delta-Y type which is connected to a tap-changer regulator transformer system 11, which is, in turn, connected to the A.-C. input terminals 12, 13 and 14 of a multiphase A.-C. line.

The tap-changer regulator transformers 11 are of the autotransformer type, although they could be of any desired type, and include main windings 15, 16 and 17, and auxiliary tapped windings 18, 19 and 20, respectively. The auxiliary windings 18, 19 and 20 each have a plurality of tap positions by which they are connected to their respective phase in the primary winding of transformer 10, these tap positions being mechanically controlled by a suitable mechanical linkage 21 extending from a reversible motor 22. Each of windings 18, 19 and 20 may also be connected for buck or boost operation through the switching means 23, 24 and 25, respectively, which operate in the usual manner.

The secondary winding of transformer 10 is then connected to a suitable bridge-connected rectifier system which includes rectifier elements 30 through 35, respectively, which are then connected to the output D.-C. buses 36 and 37 which are then connected to some suitable line such as a plurality of series connected electrolytic cells 38, or any other suitable load.

The rectifier elements 30 through 35 may be of any desired type such as silicon rectifiers, and may represent a large plurality of parallel and series connected elements in sufficient numbers and arrangements to reach the current and voltage requirements of the system.

The system of FIGURE 1 described to this point is an old and well-known type of system. Generally, where the output to load elements 38 is to be changed, the tap-changer arrangement changes the taps on windings 18, 19 and 20 so that the input voltage is altered to the rectifier system, and thus the output voltage is similarly altered. Clearly, however, the system works only for adjustment within discrete steps as defined by the tap-changer.

In accordance with the present invention, an additional control circuit including magnetic control elements is placed in the rectifier structure to achieve output regulation of the system between the steps of the tap-changing structure. Thus, in accordance with the invention, self-saturable reactors 40 through 45 are provided for the rectifiers 30 through 35, respectively. Note that the provision of self-saturating reactors of this type for a rectifier and serving as the sole regulation means for the rectifier is old.

The self-saturating reactors 40 through 45 of FIGURE 1 then have suitable control windings which are connected in series with one another, and are connected to the output of a suitable amplifier 50 which is driven from a regulator 51. The regulator 51 then has an input signal derived, for example, from the shunt 52 in bus 36.

The output current of amplifier 50 will, as will be shown more fully hereinafter, vary at least within those limits required for regulation between the steps of the tap-changing regulator system.

Once the current demand in the control circuits of the self-saturating reactors exceeds their range of regulation, and in accordance with the invention, a control relay coil 60 connected in the control circuit will cause the operation of contact 61 to contact a high contact position 62 or a low contact position 63 which controls the reversible motor 22 to cause it to either increase the tap position or decrease the tap position, respectively. By way of example, if the output current of amplifier 50 exceeds some predetermined value which determines the maximum regulation permitted from the self-saturating reactors, the contact 61 will be moved upward to engage contact 62. This will then complete a suitable circuit (not shown) to energize the lowering circuit of reversible motor 22 so that the tap position of transformer sections 18, 19 and 20 is altered so that a lower input voltage is applied to transformer 10.

In a similar manner, if there is a current drawn in the control circuit of the self-saturating reactors which is lower than some predetermined magnitude, then the contact 61 will engage contact 63 to cause reversible motor 22 to operate in a direction to increase the voltage applied to transformer 10.

The operation of the system of FIGURE 1 is best understood in detail from a consideration of FIGURE 2. Referring to FIGURE 2, the inherent rectifier and load characteristics are shown in the first quadrant; the control characteristics of the self-saturating reactors are shown in the second quadrant; the amplifier characteristic in the third quadrant; and the constant-current regulator characteristic in the fourth quadrant.

The volt-ampere characteristics of the rectifier on five different taps are illustrated by the parallel sloping lines in the first quadrant. Maximum output voltage $E_{do}$ occurs on the top tap at zero load and with no phase control. On successively lower taps and zero phase control, the characteristics intersect the voltage ordinate at successively lower points, as illustrated.

The required rectifier output current $I_{dn}$ intersects the load line at point $a$ approximately half way between the voltages of taps 2 and 3. At this value of current, intersecting the regulator characteristic at $b$, a signal of the value indicated by the dot and dash line in FIGURE 2 is applied to the input terminals of the amplifier, intersecting its curve at $c$, which in turn supplies the required control bias current to the reactors.

Since the saturable reactors can only reduce the output voltage of the rectifier and cannot increase it above the ceiling value determined by the tap voltage, the regulator transformer is shown connected to tap 2 and the reactor control characteristic is therefore the corresponding one marked 2 in the second quadrant of FIGURE 2.

The bias current supplied by the amplifier intersects the characteristic curve at point $d$ which would make the rectifier output voltage at no-load fall at point $e$, half way between the no-load voltages of taps 2 and 3. The inherent regulation droop of the rectifier brings the output voltage down to point $a$ on the load line, closing the loop and illustrating a steady-state condition.

If the primary voltage were to increase, or the load resistance decrease, so that the rectifier output current increases, the output of the regulator would decrease to $f$ as shown, and the output of the amplifier would increase to point H, pulling down the output voltage of the rectifier and picking up the tap-changer control relay 61 so as to move the tap-changer down to tap 3, as illustrated. If the output current of the rectifier were to decrease for any reason, the output of the regulator would increase to $g$, decreasing the output of the amplifier. When the control bias reaches point L, the tap-changer relay 61 closes contact 63, energizing the tap-changer motor to move in the "raising" direction, and placing the step regulator on tap 1.

In general, the reactors should have a voltage range greater than one step of the step regulator, generally a range between two and three steps. In this illustration, I have indicated approximately 2½ steps, and it should be noted that the primary regulator is caused to move before the limits of the reactors are reached. This is not a prerequisite of the system, but is done so that the regulating system can move fast and accurately in either direction, regardless of the output voltage exisiting at the time. At the same time, the number of operations required of the primary regulator is generally reduced much more than 50% so that maintenance on these regulators is greatly reduced.

The light dash line marked PF in the first quadrant shows the variation of the "displacement" power factor of the rectifier with increasing load. Disregarding excitation current, the displacement power factor reaches 100% at zero load. Regardless of which tap the regulator is on, the power factor at zero load and zero phase control will be 100%, but the slope of the line will be greater on the lower taps because of the increased percentage of reactance drop.

In the second quadrant, another power factor curve is shown coinciding essentially with the first saturable reactor control charatceristic. Regardless of load, the power factor decreases in direct proportion to the decrease of D.-C. voltage reduction by phase control. The actual displacement power factor is then 100% minus the reduction shown in the second quadrant due to phase control, and minus the reduction shown in the first quadrant due to loading.

Obviously, if there were no primary regulator and the entire range of control were obtained by large saturable reactors, the power factor at low voltages equivalent to the lower positions of the primary regulator would be very poor.

The vernier control reactors of the invention have another very useful function. If a number of rectifiers are connected in parallel to supply a large load and each rectifier has its own primary regulator, but no phase control, the distribution of current between the rectifiers can only be corrected by adjusting the individual regulators in discreet amounts. Since the bus voltage of a number of paralleled rectifiers is very "stiff," this is equivalent to a very high back-E.M.F. as far as the current response of any one rectifier is concerned. Therefore, a change of one tap amounting to say, 1%, might produce a change of current in its rectifier amounting to 5% to 10%, and in some cases even higher. Vernier phase control alleviates this condition and permits exact balancing of the current among the rectifiers, and in most cases without any tap movement.

It will be apparent to those skilled in the art that the arrangement shown in FIGURE 1 can be modified in many respects without departing from the scope of the invention. Thus, the tap-changing mechanism could be of any general type well known to the art, and could, for example, be applied directly to the primary winding of the rectifier transformer, rather than by way of a separate autotransformer system, as shown. Moreover, any standard well-known tap-changing type mechanism could be used with any suitable control relay means.

In FIGURE 1, and for purposes of illustrating the invention, I have illustrated the invention for a constant current regulator deriving its signal from the shunt 52 in the D.-C. leads of the rectifier. Obviously, however, the current-sensing device could be of any suitable nature such as a transducer or current transformer in the A.-C. lend of the rectifier. Moreover, the relay structure for relay 60 could obviously be of any desired type and could include suitable solid state or electronic relays well known and available in the art.

It will also be noted that the control of the reactors could be measured in any desired manner, where, for example, auxiliary windings will be placed on one or more of six saturable reactors 40 through 45 to measure the voltseconds of these reactors, since the voltseconds of the reactors are a measure of the reduction of the D.-C. output voltage.

This modification is schematically illustrated in FIGURE 3 for the case of reactors 40, 42 and 44. Thus, the reactors are provided with auxiliary output windings 40a, 42a and 44a which are connected to the input of a single phase bridge-connected rectifier 70. The output of rectifier 70 is then connected to the relay coil 60 of FIGURE 1 which controls the position of contact member 61.

FIGURE 4 shows the output of voltage delivered by a circuit of the type used in FIGURE 3 wherein the solid lines show the total voltage developed by the three reactors and applied to the input terminals of the bridge-connected rectifier 70.

The cross-hatched area appearing above the zero line in FIGURE 4 is proportional to the reduction of the D.-C. voltage. The cross-hatched area below the zero line is generated during the flux reversal of the reactor and thus is exactly equal to the area above the zero line. When this voltage is rectified, the negative side of the A.-C. voltage is, in effect, folded up, as illustrated for the third cycle in FIGURE 4, and is added to the voltseconds on the positive side of the zero line.

Thus, the total average output of rectifier 70 will be a function of the number of voltseconds controlled by the reactors 40 through 45, this value being used to cause operation of relay 60 to reduce or increase the tap-changer position.

For more accurate operation of the circuit of FIGURE 3, the other three reactors could also be provided with output windings for rectifier 70, these additional reactors generating an output indicated in dotted lines in FIGURE 4.

The present invention has particular application to those systems of very large rectifier installations where a single large step regulator is used to control the output of several parallel connected rectifiers. This is common practice, since the single large regulator is considerably less expensive than many small regulators needed to make up the total requirement. At the present time, there is no suitable inexpensive means for balancing the outputs of the various rectifiers which could be unbalanced by many factors. Because of this, the industry standards require that rectifiers connected in this manner be derated by 10%.

In accordance with the present invention, however, each of the individual rectifiers provided with a common step regulating means can be provided with their own respective vernier regulation system, thereby avoiding the 10% derating required by the industry's standards.

This type system is illustrated in FIGURE 5 in a line diagram wherein a main regulating transformer 100, which is controlled in a step fashion by the reversible motor 101, feeds a plurality of individual rectifier transformers 102, 103, 104 and 105 through the circuit breakers 106 through 109, respectively.

The output of each of transformers 102 through 105 is then connected to a suitable rectifier system, schematically illustrated by positive and negative rectifier elements 110–111, 112–113, 114–115 and 116–117, respectively.

A vernier magnetic regulator means is then provided for each of the rectifier systems, as schematically illustrated by reactors 118–119, 120–121, 122–123 and 124–125, respectively.

As is further schematically illustrated, a current measuring means such as current transformers 126 through 129 are provided for each of the rectifier systems which control respective regulators 130 through 133, and respective amplifiers 134 through 137 which drive the control circuits of their respective magnetic control systems.

The total output of the system is then connected to a suitable load such as the load 140, while the control current from each of the control circuits including amplifiers 134 through 137 is totalized in shunt or other suitable current measuring means 141. The output of shunt 141 is then connected to the relay such as relay 142 which is similar to relay 60 of FIGURES 1 and 3, and controls a contact 143 between contact positions 144 and 145 which causes raising or lowering, respectively, of the tap position of regulator means 100 by motor 101.

The circuit between shunt 141 and relay 142 includes four resistors 150, 151, 152 and 153 which are connected in circuit relation with respective contacts 154, 155, 156 and 157. These contacts are each operatively connected to circuit breakers 106 through 109, respectively, as indicated by dotted lines, whereby the respective contact 154 through 157 will be closed to short circuit its respective resistor when the corresponding breaker is open.

Accordingly, when all four rectifiers are in the system, all of resistors 150 through 153 will be in the circuit. If, however, one or more of the rectifiers is disconnected from the circuit, its respective resistor will be short circuited, thereby modifying the level of operation of coil 142.

Although this invention has been described with respect to its perferred embodiments, it should be understood that many variations and modificatons will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A rectifier system including a transformer connectable to an A.-C. source, regulator means connected to said transformer and operable to alter the output voltage thereof by discrete steps, motor means connected to regulator means to alter the condition of said regulator, a rectifier connected between said transformer and an output system, a phase control means in said rectifier, said phase control means being connected to an auxiliary regulating means; said auxiliary regulating means having an input circuit connected to said rectifier and an output circuit connected to phase control means, and relay control means connected to said motor and operable to a first and second condition to cause said motor to respectively increase or decrease the output of said transformer; said phase control means having a range of regulation smaller than the range of regulation of said regulator; said output circuit of said auxiliary regulator being further connected to said relay control means; said relay control means being operable to its said first condition responsive to a first output level from said auxiliary regulator and being operable to its said second condition responsive to a second output level from said auxiliary regulator, whereby said phase control means regulates between the discrete steps provided by said regulator in accordance with the output of said auxliary regulator.

2. The device substantially as set forth in claim 1 wherein said phase control means has a total regulation range corresponding to that range provided by the order of two to three steps of said regulator.

3. The device substantially as set forth in claim 1 wherein said phase control means includes self-saturating reactors connected in series with each phase of said rectifier.

4. The device substantially as set forth in claim 1 which further includes a plurality of parallel connected rectifiers having said regulator in common; each of said plurality of rectifiers having a respective phase control means therefor whereby a balance in current between said plurality of rectifiers is achieved through the independent action of their said respective phase control means.

5. The device substantially as set forth in claim 1 wherein said regulator is a tap-changing type device and said motor is a reversible motor; said reversible motor decreasing the tap position of said tap-changer when said control means is in its said first condition and increasing the tap position of said tap-changer when said control means is in its said second condition.

References Cited by the Examiner

UNITED STATES PATENTS

| 2,697,200 | 12/1954 | Ball et al. | 323—60 |
| 2,772,385 | 11/1956 | Dainkins et al. | 321—16 |
| 2,883,600 | 4/1959 | Kleinvogel et al. | 321—16 |
| 2,885,628 | 5/1959 | Pell et al. | 323—43.5 |
| 2,971,148 | 2/1961 | Diebold | 321—25 |

JOHN F. COUCH, *Primary Examiner.*

M. L. WACHTELL, *Assistant Examiner.*